United States Patent
Nides et al.

(10) Patent No.: US 11,075,935 B2
(45) Date of Patent: Jul. 27, 2021

(54) SYSTEM AND METHOD FOR IDENTIFYING CYBERSECURITY THREATS

(71) Applicant: KPMG LLP, New York, NY (US)

(72) Inventors: David Benjamin Nides, Chicago, IL (US); David Phillip Cartier, New York, NY (US); Hernan Rael Cortes, Grand Rapids, MI (US); Edward L. Goings, Plainfield, IL (US); Zachariah Sheldon Harris, Grand Rapids, MI (US); Brian John Marks, Chicago, IL (US); Matthew Lewis Seyer, Castle Rock, CO (US); Andrea Sancho Silgado, Chicago, IL (US)

(73) Assignee: KPMG LLP, New York, NY (US)

( * ) Notice: Subject to any disclaimer, the term of this patent is extended or adjusted under 35 U.S.C. 154(b) by 89 days.

(21) Appl. No.: 15/852,081

(22) Filed: Dec. 22, 2017

(65) Prior Publication Data

US 2019/0199744 A1    Jun. 27, 2019

(51) Int. Cl.
*H04L 29/06* (2006.01)

(52) U.S. Cl.
CPC ...... *H04L 63/1433* (2013.01); *H04L 63/0428* (2013.01); *H04L 63/1425* (2013.01)

(58) Field of Classification Search
CPC ............. H04L 63/1433; H04L 63/0428; H04L 63/302; H04L 63/1425; H04L 63/1441;

(Continued)

(56) References Cited

U.S. PATENT DOCUMENTS

| 7,376,969 | B1 * | 5/2008 | Njemanze | G06F 21/55 |
| | | | | 709/224 |
| 7,603,344 | B2 * | 10/2009 | Bousquet | G06Q 50/18 |

(Continued)

FOREIGN PATENT DOCUMENTS

JP    2009110334 A  *  5/2009

OTHER PUBLICATIONS

Rabiah Ahmad, et al., Threats Identification in Healthcare Information Systems Using Genetic Algorithm and Cox Regression, Aug. 2009, pp. 1-4.*

(Continued)

*Primary Examiner* — Jeffery L Williams
(74) *Attorney, Agent, or Firm* — Hunton Andrews Kurth LLP

(57) ABSTRACT

The invention relates to a computer-implemented system and method for automatic collection, analysis and reporting of data relating to a cybersecurity threat. The method may comprise the steps of: presenting an interface through which an executable can be configured and automatically generated; transmitting the executable to a client to enable the client to execute the executable on client systems to automatically collect forensic data; receiving from the client an encrypted data package that includes the forensic data; using a forensic toolset to automatically analyze the forensic data; presenting an option to select one or more of at least two types of output reports designed for different types of readers; inputting the analysis files into an automatic report generator to automatically generate the types of output reports selected by the client; and sending the output reports selected by the client to the client.

11 Claims, 14 Drawing Sheets

(58) Field of Classification Search
CPC .......... H04L 63/1408; G06F 17/30569; G06F 11/008
See application file for complete search history.

(56) References Cited

U.S. PATENT DOCUMENTS

| | | | |
|---|---|---|---|
| 8,832,148 B2 | 9/2014 | Kisin et al. | |
| 8,862,660 B1* | 10/2014 | Fausak | H04L 67/42 709/200 |
| 9,047,464 B2 | 6/2015 | Sambamurthy et al. | |
| 9,555,544 B2 | 1/2017 | Bataller et al. | |
| 10,609,065 B2 | 3/2020 | Jones et al. | |
| 2007/0294368 A1* | 12/2007 | Bomgaars | H04L 63/20 709/217 |
| 2009/0164522 A1* | 6/2009 | Fahey | H04L 63/1441 |
| 2010/0058475 A1* | 3/2010 | Thummalapenta | H04L 63/1433 726/25 |
| 2012/0079596 A1* | 3/2012 | Thomas | G06F 21/566 726/24 |
| 2012/0102571 A1 | 4/2012 | Sheldon | |
| 2012/0191660 A1* | 7/2012 | Hoog | G06F 21/552 707/661 |
| 2014/0259170 A1* | 9/2014 | Amsler | H04L 63/20 726/23 |
| 2014/0331326 A1* | 11/2014 | Thakur | H04L 63/1433 726/25 |
| 2015/0121456 A1* | 4/2015 | Milman | H04L 63/10 726/3 |
| 2016/0080408 A1* | 3/2016 | Coleman | G06F 21/577 726/22 |
| 2017/0012998 A1 | 1/2017 | Thornbury et al. | |
| 2017/0041337 A1* | 2/2017 | Hoog | G06F 21/552 |
| 2017/0171209 A1* | 6/2017 | Licklider | G06F 21/6218 |
| 2017/0171231 A1* | 6/2017 | Reybok, Jr. | H04L 63/14 |
| 2017/0236081 A1* | 8/2017 | Grady Smith | G06Q 10/067 705/7.36 |
| 2017/0264589 A1* | 9/2017 | Hunt | G06F 21/552 |
| 2018/0375886 A1* | 12/2018 | Kirti | H04L 63/1416 |
| 2019/0166164 A1* | 5/2019 | Yamada | G06F 16/258 |
| 2019/0387005 A1* | 12/2019 | Zawoad | H04L 63/1425 |

OTHER PUBLICATIONS

Bennett Pine, (10 things to consider when terminating an employee, https://www.bizjournals.com/bizjournals/how-to/human-resources/2014/10/10-things-to-consider-when-terminating-an-employee.html, Oct. 9, 2014, hereinafter Pine).*

Osterman Research, Best Practices for Protecting Your Data When Employees Leave Your Company, Dec. 2016, https://spanning.com/downloads/SBSU-whitepaper-osterman-protecting-data-when-employees-leave-company.pdf, hereinafter Osterman).*

International Search Report and Written Opinion issued in corresponding International Application No. PCT/US2018/065130, dated Mar. 18, 2019.

* cited by examiner

| Device #6 | Information | Notes |
|---|---|---|
| Device Serial Number | 4c53055349851020211 0023 | |
| Device Name | SanDisk Ultra USB Device | |
| Volume Letter | d:\ | |
| Volume Name | "J_Doe" | Data from link files and/or jump lists (Without readyboost data this cannot be verified) |
| Volume Serial Number | "e2e2-32ad" | Data from link files and/or jump lists (Without readyboost data this cannot be verified) |
| Volume Type | "removable" | Data from link files and/or jump lists (Without readyboost data this cannot be verified) |
| Device/Volume Friendly Name | "J_Doe" | |
| Readyboost | No | Without the presence of Readyboost, the ability to correlate artifacts (e.g. link files, jump lists...) 1 is limited. |

Artifacts related to the device

| Date/Time [UTC] | Event | Source | Confidence related to Device Serial Number |
|---|---|---|---|
| 06/16/2016 15:58:16 | Device first connected (Drivers installed for the device) | Event 20003 from System Windows Event Log | Medium (Check how far the System Log goes) |
| 06/16/2016 15:58:19 | Device first connected (Drivers installed for the device) | Event 20001 from System Windows Event Log | Medium (Check how far the System Log goes) |
| 06/16/2016 15:58:21 | Device installed | SetupAPI Device Log | High |
| 06/16/2016 15:58:21 | Device first connected (Drivers installed for the device) | Event 20001 from System Windows Event Log | Medium (Check how far the System Log goes) |
| 06/16/2016 15:58:21 | Device first connected (Drivers installed for the device) | Event 20003 from System Windows Event Log | Medium (Check how far the System Log goes) |
| 06/16/2016 15:58:24 | Device first connected (Drivers installed for the device) | Event 20001 from System Windows Event Log | Medium (Check how far the System Log goes) |
| 06/16/2016 15:58:24 | Device connected | Event 2100 from Microsoft-Windows-DriverFrameworks-UserMode/Operational Windows Event Log | High |
| 06/16/2016 15:58:24 | Device connected | Event 2105 from Microsoft-Windows-DriverFrameworks-UserMode/Operational Windows Event Log | High |
| 06/16/2016 15:58:24 | Device connected | Event 2005 from Microsoft-Windows-DriverFrameworks-UserMode/Operational Windows Event Log | High |
| 06/16/2016 15:58:24 | Device connected | Event 2004 from Microsoft-Windows-DriverFrameworks-UserMode/Operational Windows Event Log | High |
| 06/16/2016 15:58:24 | Device connected | Event 2003 from Microsoft-Windows-DriverFrameworks-UserMode/Operational Windows Event Log | High |
| 06/16/2016 15:58:24 | Device connected | Event 2010 from Microsoft-Windows-DriverFrameworks-UserMode/Operational Windows Event Log | High |
| 06/16/2016 15:58:25 | Shellbag registry entry: "Desktop\CLSID_MyComputer\D:\Tools\" | Shellbag registry entry with a directory path matching the drive letter | Low (Without readyboost data this cannot be verified) |
| 06/16/2016 15:58:26 | Target file/dir MRU date/time: "D:\Tools\nomachine_5.1.26_1.exe" | Jump List with a file/dir path matching the drive letter. Volume serial number referenced: e2e2-32ad | Low (Without readyboost data this cannot be verified) |
| 06/16/2016 15:58:38 | Target file executed:\DEVICE\HARDDISKVOLUME2\TOOLS\NOMACHINE_5.1.26.1.EXE | Prefetch entry with a file/dir matching the volume serial number: e2e2-32ad | |
| 06/16/2016 15:58:24 | Webcache entry: "John@file:///D:/Tools/nomachine_5.1.26_1.exe" | Webcache entry with a file/dir matching the drive letter. | Low (Without readyboost data this cannot be verified) |
| 06/16/2016 17:00:52 | Device disconnected | Event 2102 from Microsoft-Windows-DriverFrameworks-UserMode/Operational Windows Event Log | High |

550

| Timestamp | Artifact (timestamp) | path\app_name |
|---|---|---|
| 07/11/2016 15:55:43.011 | Jump List (MRU_date[UTC]) | {CLSID_MyComputer}\\C:\\Windows\\system32\\my_program.exe |
| 07/11/2016 15:55:43.011 | User Journal (entry_date[UTC]) | MY_PROGRAM.EXE-FB901B09.pf |
| 07/11/2016 16:28:45.538 | EventLogs (entry_date[UTC]) | C:\\Windows\\system32\\my_program.exe |
| 07/11/2016 16:28:45.538 | RunKeys (regdate[UTC]) | C:\\Windows\\system32\\my_program.exe |
| 07/11/2016 17:28:30.907 | Prefetch (last_run[UTC]) | \DEVICE\HARDDISK\VOLUME3\WINDOWS\SYSTEM32\MY_PROGRAM.EXE |
| 07/11/2016 17:28:45.538 | ShimCache (regdate[UTC]) | \??\C:\\Windows\\system32\\my_program.exe |
| 07/11/2016 17:28:45.538 | EventLogs (entry_date[UTC]) | C:\\Windows\\system32\\my_program.exe |
| 07/11/2016 22:01:43.011 | Jump Journal (entry_date[UTC]) | MY_PROGRAM.EXE-FB901B09.pf |

552

| Timestamp | Artifact (timestamp) | path\app_name | MAC Times of Target File | MAC Times of Artifact | Flag | Module_list | User | volume serial | Volume Name | Event ID |
|---|---|---|---|---|---|---|---|---|---|---|
| 07/11/2016 15:55:43.011 | JumpList (MRU_date[UTC]) | {CLSID_MyComputer}\\C:\\Windows\\system32\\my_program.exe | 07/11/2016 15:46:39.551 07/11 | 07/11/2016 15:46:39.551, 07/11 | N/A | N/A | N/A | d673-df1a | OS | N/A |
| 07/11/2016 15:55:43.011 | User Journal (entry_date[UTC]) | MY_PROGRAM.EXE-FB901B09.pf | N/A, N/A, N/A | N/A, N/A, N/A | access_changed_fi | N/A | N/A | N/A | N/A | N/A |
| 07/11/2016 16:28:45.538 | EventLogs (entry_date[UTC]) | C:\\Windows\\system32\\my_program.exe | N/A, N/A, N/A | N/A, N/A, N/A | N/A | N/A | John Doe | N/A | N/A | 4688 |
| 07/11/2016 16:28:45.538 | RunKeys (regdate[UTC]) | C:\\Windows\\system32\\my_program.exe | N/A, N/A, N/A | N/A, N/A, N/A | RUN | N/A | N/A | d673-df1a | N/A | N/A |
| 07/11/2016 17:28:30.907 | Prefetch (last_run[UTC]) | \DEVICE\HARDDISK\VOLUME3\WINDOWS\SYSTEM32\MY_PROGRAM.EXE | 07/11/2016 15:46:39.551, 07/11 | N/A, N/A, N/A | N/A | \DEVICE\\HARD | N/A | N/A | N/A | N/A |
| 07/11/2016 17:28:45.538 | ShimCache (regdate[UTC]) | \??\C:\\Windows\\system32\\my_program.exe | 11/21/2010 3:23:56, N/A N/A | N/A, N/A, N/A | exec | N/A | N/A | N/A | N/A | N/A |
| 07/11/2016 17:28:45.538 | EventLogs (entry_date[UTC]) | C:\\Windows\\system32\\my_program.exe | N/A, N/A, N/A | N/A, N/A, N/A | N/A | N/A | John Doe | N/A | N/A | 4673 |
| 07/11/2016 22:01:43.011 | User Journal (entry_date[UTC]) | MY_PROGRAM.EXE-FB901B09.pf | N/A, N/A, N/A | N/A, N/A, N/A | del | N/A | N/A | N/A | N/A | N/A |

FIG. 5B

| Date | Files Created | Files Accessed | Files Modified | Files Deleted | Top 10 Created File Extensions | Top 10 Accessed File Extensions | Top 10 Modified File Extensions | Top 10 Deleted File Extensions |
|---|---|---|---|---|---|---|---|---|
| 2016-06-23 | 6 | 28 | 29 | 0 | :3, tmp:1, ini: 2, | :25, tmp:1, ini: 2, | :25, dat: 1, tmp: 1, ini: 2, | None |
| 2016-06-22 | 3311 | 8450 | 8742 | 5 | :949, xml:90, exe: 29, xbf: 243 p | :4177, xml: 110, exe: 141, nlp: 48 | :4422, xml: 124, ext 140, log: 69 | :4, ini: 1, |
| 2016-06-21 | 921 | 1513 | 1633 | 0 | :607, ldb: 12, log2: 35, log1:35, | :1080, ldb: 12, log2: 36, log1: 36, | :1073, xml: 56, recover: 75, log2 | None |
| 2016-06-20 | 131 | 315 | 313 | 5 | :55, xml: 3, js: 2, dat: 6, json: 2, | :172, xml:5, library: 4, dat: 8, et | :197, xml: 7, log: 4, sth: 10, libra | dat: 1, txt: 2, ini: 1, png: 1, |
| 2016-06-19 | 27232 | 27693 | 6654 | 0 | :4277, xml: 149, exe: 270, pri: 19 | :4601, xml: 165, exe: 294, cdf-ms | :4601, xml: 158, txt: 135, cdf-ms: | None |
| 2016-06-18 | 0 | 0 | 10 | 0 | None | None | sth: 10, | None |
| 2016-06-15 | 0 | 0 | 160 | 0 | None | None | bin: 2, exe: 27, crx: 4, dll: 56, dat | None |
| 2016-06-14 | 1 | 1 | 152 | 0 | tmp: 1, | tmp: 1, | exe: 6, 0: 6, 9b15f6a: 5, js: 5, cat | None |
| 2016-06-12 | 35 | 36 | 34 | 0 | :34, etl: 1, | :34, etl: 2, | :34, | None |
| 2016-06-11 | 1894 | 3179 | 2543 | 1 | :878, exe: 30, manifes: 36, cat | :1319, pnf: 83, exe: 64, cat: 78, d | :1296, pnf: 83, cat: 74, dat 68, p | lnk: 1, |
| 2016-06-10 | 9690 | 10629 | 4952 | 0 | :2773, nlp: 192, resx: 282, exe: 5 | :2616, nlp: 148, resx: 258, exe: 6 | :2469, cdf-ms: 124, resx: 180, ex | None |
| 2016-06-09 | 0 | 0 | 5 | 0 | None | None | old: 5, | None |
| 2016-06-08 | 98 | 85 | 111 | 0 | :23, 0: 4, js: 5, gif: 4, json: 2, htm | :12, ldb: 1, gif: 4, js: 5, 0: 4, json: | :14, ldb: 1, json: 1, png: 2, lnk: 1 | None |
| 2016-06-07 | 0 | 0 | 8 | 0 | None | None | xml: 2, res: 4, png: 2, | None |
| 2016-06-06 | 937 | 947 | 981 | 0 | :757, tmp: 18, old: 4, log: 7, ldb: | :751, tmp: 29, old: 6, log: 7, ldb: | :758, tmp: 29, old: 6, log: 4, 0: 4, | None |
| 2016-06-04 | 1024 | 909 | 920 | 0 | :635, tmp: 18, old: 8, log: 9, ldb | :537, tmp: 7, txt 2, old: 3, log: 9, ldb: 1 | :496, tmp: 7, txt 2, old: 3, log: 4, | None |
| 2016-06-03 | 1371 | 1434 | 1514 | 0 | :371, xml: 105, cso: 60, recover | :335, xml: 105, cso: 60, recover. | :338, xml: 105, cso: 60, assets: 1 | None |
| 2016-06-02 | 0 | 0 | 8526 | 0 | None | None | mum: 3733, xml: 1, json: 1, cat: 4 | None |
| 2016-06-01 | 27 | 28 | 4984 | 0 | :20, log: 1, bdic: 1, pf: 1, lnk: 2, | :20, log: 1, bdic: 1, pf: 1, lnk: 3, e | :31, manifes: 4944, bdic: 1, js: 1 | None |

| Date | Target Username | Logon Counts | Logon types |
|---|---|---|---|
| 06/22/2016 | john | 6 (Total logons in the day: 9) | [Logon Type 2: 6] |
| 06/22/2016 | janedoe | 3 (Total logons in the day: 9) | [Logon Type 3: 3] |
| 06/21/2016 | john | 14 (Total logons in the day: 16) | [Logon Type 2: 14] |
| 06/21/2016 | janedoe | 2 (Total logons in the day: 16) | [Logon Type 3: 2] |
| 06/20/2016 | john | 2 (Total logons in the day: 2) | [Logon Type 2: 2] |
| 06/19/2016 | john | 12 (Total logons in the day: 12) | [Logon Type 3: 2][Logon Type 2: 10] |
| 06/12/2016 | john | 2 (Total logons in the day: 2) | [Logon Type 2: 2] |
| 06/11/2016 | john | 6 (Total logons in the day: 7) | [Logon Type 2: 6] |
| 06/11/2016 | janedoe | 1 (Total logons in the day: 7) | [Logon Type 3: 1] |
| 06/10/2016 | john | 2 (Total logons in the day: 2) | [Logon Type 2: 2] |
| 06/08/2016 | john | 4 (Total logons in the day: 4) | [Logon Type 2: 4] |
| 06/06/2016 | janedoe | 2 (Total logons in the day: 2) | [Logon Type 3: 2] |

FIG. 7

Report Information

The purpose of this report is to provide an automated high-level overview of computer system activity that may be of potential interest related to a departing employee. It is important to note this report was created in an automated fashion. Therefore false positives may exist and further investigation may be required to answer questions.

Below is a summary of the matter specifics, including the system reviewed:

| | |
|---|---|
| Client Name | Demo |
| Matter/Case Number | Demo-0001 |
| Evidence Number | Demo-0001-0001 |
| Custodian Name | John Doe |
| Employee Profile Username | jdoe |
| Total User Profiles in the System | 6 |
| Employee Departure Notification Date | 2016-06-15 00:00:00 |
| Employee last Day of Employment | 2016-07-01 00:00:00 |
| Serial Number | X123456789 |
| Host Name | ABS-T7500 |
| Operating System | Windows 7 Professional |
| OS Install Date/Time | 2016-06-17 23:13:55 (UTC) |
| OS Time Zone | Eastern Standard Time |
| OS Hard Disk Size | 500 GB |
| Image Type | Demo |
| Volume Shadow Copies (VSCs) in collection | 8 |
| KDR Collection Package | Responder-012317-165903461000.enc |
| KDR Collection Date/Time | 2017-01-23 16:59:03.461000 (CST) |
| KDR Collection Package MD5 | 3407acd906f24b8cd0ea934fc4022b44 |
| KDR Index Name | 11168 |

Scope of the report

The scope of this report was the last 30 days of the employee's employment starting on 2016-06-1 at approximately 00:00:00 (UTM) to 2016-07-01 at approximately 00:00:00 (UTC).

FIG. 8

Summary of Findings

The system was reviewed in context to seven categories commonly associated with at risk activities. Below is a summary of potentially notable findings that are detailed in this report. Note some results are filtered to only show the last 30 days of activity.

| Removable Storage Device Activity | Filter on Results | Total | Potential Risk* |
|---|---|---|---|
| All unique removable storage devices | N/A | 33 | Unknown |
| Removable storage device connections | Last 30 days | 5 | Medium |
| Mobile phone backup files | Last 30 days | 0 | Low |
| DVD/CD-ROM read/write activity | N/A | 1 | Medium |
| File Activity | Filter on Results | Total | Potential Risk* |
| Overview of file activity | Last 30 days | 31 | Unknown |
| Accessed items | Last 30 days | 81 | Low |
| Items interacted with from potential external sources | Last 30 days | 291 | High |
| Items interacted with from network share drives | Last 30 days | 280 | High |
| Archive/encrypted containers created | Last 30 days | 0 | Low |
| User files created | Last 30 days | 37 | Medium |
| User files modified | Last 30 days | 35 | Medium |
| User files deleted | Last 30 days | 34 | High |
| Recycle Bin items | Last 30 days | 0 | Low |
| Microsoft Office alerts | Last 30 days | 147 | Unknown |
| Printed files | Last 30 days | 0 | Low |
| Windows searched terms | N/A | 100 | Unknown |
| Typed paths | N/A | 25 | Unknown |
| Internet Activity | Filter on Results | Total | Potential Risk* |
| Web browsers present | N/A | 3 | Low |
| Downloaded files | Last 30 days | 0 | Low |
| Typed URLs | N/A | 5 | Unknown |
| Search engine queries | Last 30 days | 5 | Unknown |
| Cloud storage websites visited | Last 30 days | 0 | Low |
| Personal email websites visited | Last 30 days | 0 | Low |
| All Internet history | Last 30 days | 32 | Unknown |
| Program Activity | Filter on Results | Total | Potential Risk* |
| File sharing software present | N/A | 1 | Medium |
| Encryption software present | N/A | 1 | Medium |
| Remote access software present | N/A | 5 | High |

FIG. 9A

| | | | |
|---|---|---|---|
| Instant messaging communication software present | N/A | 2 | High |
| Application development software present | N/A | 6 | Medium |
| Cloud storage software present | N/A | 1 | High |
| File compression software present | N/A | 3 | High |
| Anti-forensics software present | N/A | 2 | High |
| Virtualization software present | N/A | 1 | Low |
| Virtual machine related files created/modified/accessed | Last 30 days | 0 | Low |
| Programs uninstalled | Last 30 days | 4 | Medium |
| Email Activity | Filter on Results | Total | Potential Risk* |
| Email containers | N/A | 5 | Unknown |
| Email attachments | Last 30 days | 0 | Low |
| External email addresses | Last 30 days | 0 | Low |
| Other Activity | Filter on Results | Total | Potential Risk* |
| Associated networks | N/A | 11 | Unknown |
| User accounts on the system | N/A | 6 | Unknown |
| Volume Shadow Copies in the collection | N/A | 1 | Unknown |

\* The potential risk rating is for consideration only to help classify risks based on the criteria outlined in Appendix A. Actual risks may vary.

FIG. 9B

Appendix A – Risk criteria

The risk rating is for consideration only to help classify risks based on the following criteria. Actual risks may vary. The criteria were set bsed on the level of importance of the results regarding a departing employee investigation.

| | |
|---|---|
| Low | The number of results is in the expected range for the usual employee system |
| Medium | The number of results is not in the high risk range but the investigator should verify the hits |
| High | The number of results is outside the expected range for the usual employee system |

| Removable Storage Device Activity | Filter on Results | Green | Yellow | Red |
|---|---|---|---|---|
| All unique removable storage devices | N/A | N/A | N/A | N/A |
| Removable storage device connections | Last 30 days | ≤0 | 1 - 9 | ≥10 |
| Mobile phone backup files | Last 30 days | ≤3 | 4 - 9 | ≥10 |
| DVD/CD-ROM read/write activity | N/A | ≤0 | >1 | |
| File Activity | Filter on Results | Green | Yellow | Red |
| Overview of file activity | Last 30 days | N/A | N/A | N/A |
| Accessed items | Last 30 days | ≤300 | 301 - 999 | ≥1000 |
| Items interacted with from potential external sources | Last 30 days | ≤0 | 1 - 9 | ≥10 |
| Items interacted with from network share drives | Last 30 days | ≤0 | 1 - 9 | ≥10 |
| Archive/encrypted containers created | Last 30 days | ≤0 | 1- 4 | ≥5 |
| User files created | Last 30 days | ≤10 | 1 - 99 | ≥100 |
| User files modified | Last 30 days | ≤10 | 1 - 99 | ≥100 |
| User files deleted | Last 30 days | ≤0 | 1 - 19 | ≥20 |
| Recycle Bin items | Last 30 days | ≤10 | 11 - 99 | ≥100 |
| Microsoft office alerts | Last 30 days | N/A | N/A | N/A |
| Printed files | Last 30 days | ≤0 | 1 - 9 | ≥10 |
| Windows searched terms | N/A | N/A | N/A | N/A |
| Typed paths | N/A | N/A | N/A | N/A |
| Internet Activity | Filter on Results | Green | Yellow | Red |
| Web browsers installed | N/A | ≤3 | 4 - 14 | ≥15 |
| Downloaded files | Last 30 days | ≤0 | 1 - 9 | ≥10 |
| Typed URLs | N/A | N/A | N/A | N/A |
| Search engine queries | Last 30 days | N/A | N/A | N/A |
| Cloud storage websites visited | Last 30 days | ≤0 | – | ≥1 |
| Personal email websites visited | Last 30 days | ≤0 | – | ≥1 |
| All Internet history | Last 30 days | N/A | N/A | N/A |
| Program Activity | Filter on Results | Green | Yellow | Red |
| File sharing software installed | N/A | ≤0 | 1 | ≥2 |
| Encryption software installed | N/A | ≤0 | 1 | ≥2 |
| Remote access software installed | N/A | ≤0 | 1 | ≥2 |

FIG. 10A

| | | | | |
|---|---|---|---|---|
| Instant messaging communications software installed | N/A | ≤0 | 1 | ≥2 |
| Application development software installed | N/A | ≤0 | 1 - 9 | ≥10 |
| Cloud storage software installed | N/A | ≤0 | - | ≥1 |
| File compression software installed | N/A | ≤0 | 1 | ≥2 |
| Anti-forensics software installed | N/A | ≤0 | - | ≥1 |
| Virtualization software installed | N/A | ≤1 | 2 - 9 | ≥10 |
| Virtual machine related files created/modified/accessed | Last 30 days | ≤5 | 6 - 19 | ≥20 |
| Programs uninstalled | Last 30 days | ≤0 | 1 - 9 | ≥10 |
| Email Activity | Filter on Results | Green | Yellow | Red |
| Email containers | N/A | N/A | N/A | N/A |
| Email attachments | Last 30 days | ≤10 | 11 - 29 | ≥30 |
| External email addresses | Last 30 days | ≤0 | 1 - 4 | ≥5 |
| Other Activity | Filter on Results | Green | Yellow | Red |
| Associated networks | N/A | N/A | N/A | N/A |
| User accounts on the system | N/A | N/A | N/A | N/A |
| Volume Shadow Copies in the collection | N/A | N/A | N/A | N/A |

FIG. 10B

SYSTEM AND METHOD FOR IDENTIFYING CYBERSECURITY THREATS

FIELD OF THE INVENTION

The present invention relates generally to identifying cybersecurity threats, and more particularly to performing digital forensic analysis to identify cybersecurity threats, such as those caused by malware, hacking, and unauthorized removal of data from computer systems.

BACKGROUND

Identification of cybersecurity threats is crucial in protecting various interests of a company, such as its trade secrets, proprietary information, personal information, and other intellectual property and privacy rights. In identifying such threats, time is often of the essence. For example, in the case of a departing employee headed to a competitor, the company may need to retain a cybersecurity consultant to determine if the employee had misused or copied company data leading up to their departure. Traditionally this process would start by requiring a consultant to travel to the client site, make mirror hard drive forensic copies of the computers of the departing employee, transport the collected data to the consultant's facility, analyze the forensic data with various forensic tools, and finally write a report based on the forensic findings. This traditional process can easily span a period of days or weeks in many cases. Notably this process is also problematic because it presents a number of other challenges, such as the handling of a large volume of over-collected data and generation of results that are inconsistent or not comprehensive due to the ad hoc nature of the process or forensic tools. Lastly, and most importantly, the unpredictable nature of this delivery model makes it costly and burdensome to manage spend. Hence, it would be desirable to have a system and method that could overcome the foregoing disadvantages of traditional processes.

SUMMARY

According to one embodiment, the invention relates to a computer-implemented system and method for automatic collection, analysis and reporting of a cybersecurity threat. The method may include the step of providing a graphical user interface through which an executable can be configured and automatically generated. The interface is preferably designed to receive artifact options and data source designations. The executable is transmitted to a client to enable the client to execute the executable on one or more systems of the client to automatically collect forensic data. The system receives from the client an encrypted data package which includes the forensic data automatically collected by the executable and decrypts the encrypted data package to produce decrypted forensic data. The method includes the use of a forensic toolset to automatically analyze the decrypted forensic data, the forensic toolset comprising a set of forensic tools that output analysis results. The client can be presented with an option to select one or more of at least two types of output reports designed for different types of audiences at the client, and the client provides a selection of one or more of the at least two types of output reports. The method includes inputting the analysis results into an automatic report generator to automatically generate the types of output reports selected by the client and sending the output reports to the client.

The invention also relates to computer-implemented system for automatic collection, analysis and reporting of forensic data, and to a computer readable medium containing program instructions for executing a method for automatic collection, analysis and reporting of forensic data.

According to another embodiment, the invention relates to a method for identifying one or more cybersecurity threats. The method includes: obtaining targeted data from at least one client computer using a self-executable file; encrypting the targeted data; receiving the encrypted targeted data; decrypting the transmitted data; processing the decrypted data; and generating one or more reports based on the processing wherein results from the processing are normalized for consistency.

According to another embodiment, the invention relates to a non-transitory computer-readable medium storing instructions, upon execution by one or more processors, configured to perform: obtaining targeted data from one or more computers; encrypting the targeted data; and receiving the encrypted data at a remote server that is configured to decrypt and automatically process the targeted data.

These and other embodiments and advantages will become apparent from the following detailed description, taken in conjunction with the accompanying drawings, illustrating by way of example the principles of the various exemplary embodiments of the invention.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 4B is a table that illustrates a normalization of removable device activity according to an exemplary embodiment of the invention.

FIG. 5B is table showing an example of the normalization of the program execution analysis of FIG. 5A according to an exemplary embodiment of the invention.

FIG. 6 depicts an example of a table of file extension activity according to an exemplary embodiment of the invention.

FIG. 7 depicts an example of a table of logon analytics according to an exemplary embodiment of the invention.

FIG. 8 is an example of a Report Information summary according to an exemplary embodiment of the invention.

FIGS. 9A and 9B depict a Summary of Findings in a report according to an exemplary embodiment of the invention.

FIGS. 10A and 10B provide an explanation of risk criteria according to an exemplary embodiment of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

According to one embodiment, the invention relates to an automated system and method for forensic analysis of the computer systems, devices, shared drives, and databases of a company or other organization (referred to herein as the "client"). An objective of the forensic analysis is to identify cybersecurity threats, such as those caused by malware, hacking, or removal of data by a departing employee, for example. The forensic analysis may include the automated collection of forensic artifacts and other data from the client's computer systems, devices, and data sources. As used herein, "artifact" generally refers to an electronic record of some action that has been taken with a computing device, such as the deletion of a file, editing a file, execution of a program, downloading a file onto a removable storage device (e.g., flash drive or external hard drive), capturing an image, sending an email message, sending a text message, etc. Various embodiments of the invention provide an on-demand service that enables a client to self-collect forensic data, automatically have the data analyzed with a comprehensive set of forensic tools, and receive a customized report of the forensic analysis. The system and method can be applied to a wide range of computer systems, devices, software, and data sources.

To accomplish the forensic analysis, the system includes three primary components according to an exemplary embodiment of the invention: a collection component an analysis component, and a reporting component. The collection component may utilize a standalone executable computer program (referred to as the "executable") which runs on a client's systems, devices and drives. The analysis component may utilize a collection of forensic tools to automatically analyze the collected data. The reporting component may comprise software to automatically generate different types of reports based on the analysis of the collected data. These components are described in connection with the flow chart shown in FIG. 1.

Figure 1:
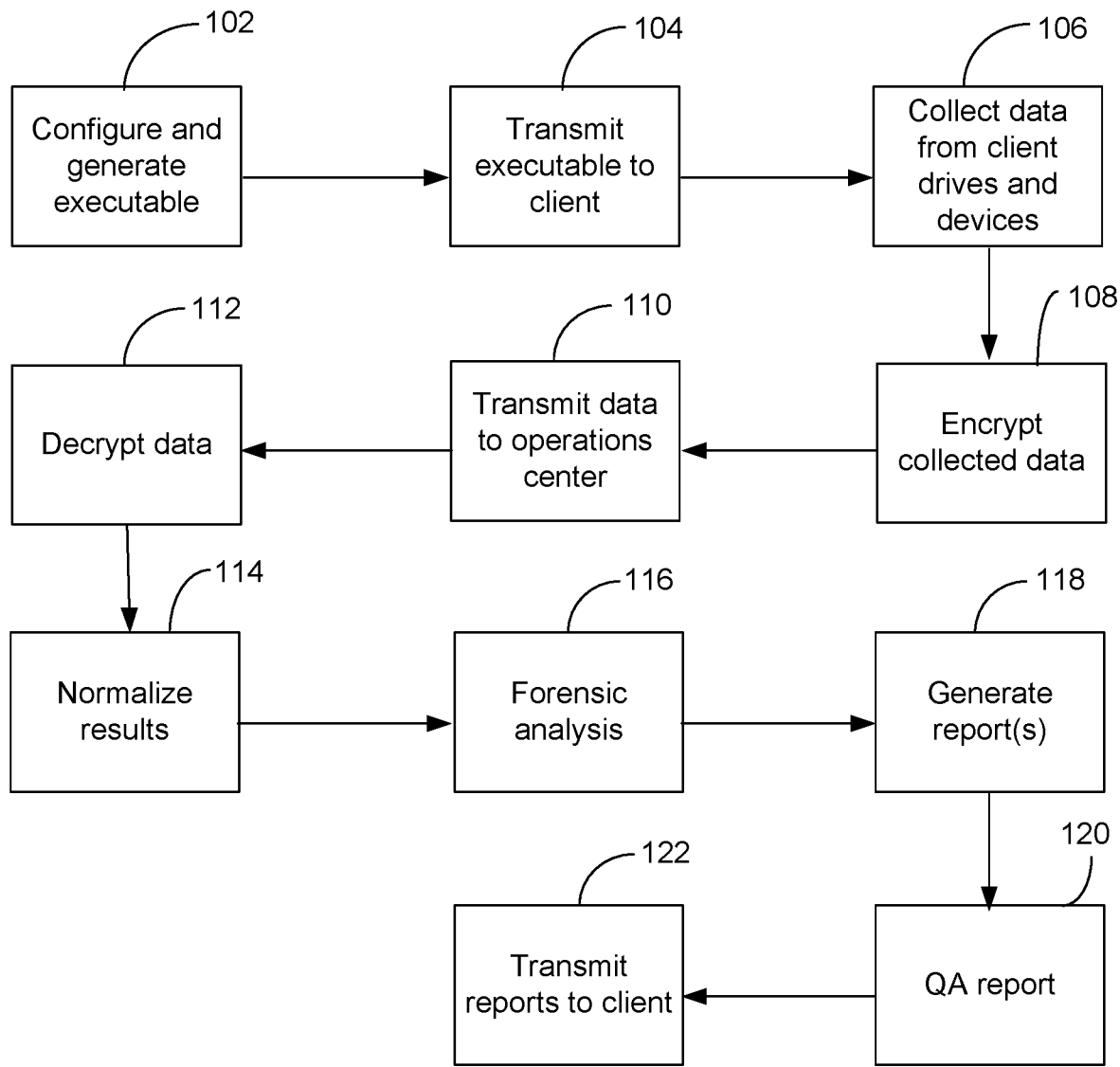
FIG. 1 is flowchart illustrating a process for automated collection, analysis of and reporting of data relating to a cybersecurity event according to an exemplary embodiment of the invention.
Figure 3:
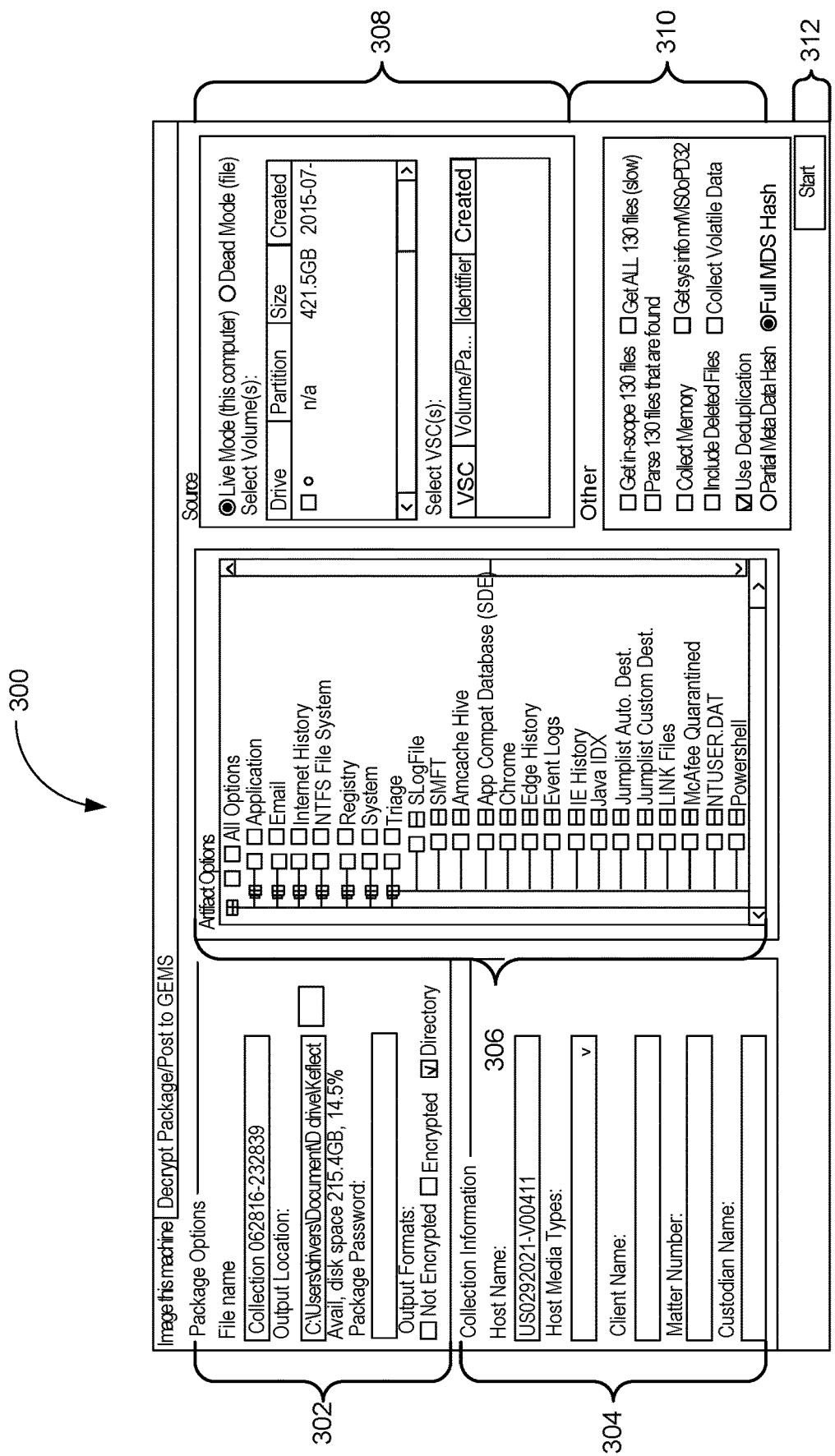
FIG. 3 is a drawing illustrating an example of a graphical user interface used for configuring an executable according to an exemplary embodiment of the invention.

In step 102 of FIG. 1, the collection component is used by a party such as a cybersecurity consultant or service provider (sometimes referred to herein as the "consultant") or the client to configure and generate the executable. The executable can be customized and generated by the consultant or client using a graphical user interface (GUI) wrapper and command line interface (CLI), for example, or other type of interface. An example of such a GUI is shown in FIG. 3, and will be described further below. The GUI allows the consultant or client to customize and configure the executable by selecting and deselecting certain types of artifacts and/or individual artifacts that will be the targets of the data collection, based on the desired scope of the forensic analysis. The executable is customized by the consultant or client based on the needs of the client. For example, based on the client's input, the consultant or client may specify one set of artifacts to collect in connection with a departing employee, and another set of artifacts to collect for a malware attack. Or, the consultant or client may opt to collect all available artifacts in the event of a broader investigation, such as in connection with a suspected data breach. Once the consultant or client specifies the desired configuration of the executable using the GUI, the system can automatically generate the executable.

In step 104, the system transmits the executable to the client. The client can then access the executable and can initiate the automatic collection of artifacts and other data by the executable.

In step 106, when the executable is executed, it automatically collects the specified artifacts and other data from the client's systems and devices. The data to be collected can be defined according to several characteristics, including the specific computers, devices, shared drives, and databases to be searched, whether volume shadow copies (VSC), files, disk images, and/or live client computer systems are included, the applicable date ranges, and the types of artifacts to be collected. Examples of computers to be searched may include desktop computers, laptop computers, and servers; examples of devices may include tablet computers, mobile phones, and removable storage media (e.g., flash drives, CDs, and external hard drives); examples of shared drives and databases may include those operated and maintained by the client on the client's premises as well as those operated for the client in the cloud by a third party cloud provider.

The collected data is stored in a temporary data storage location and then encrypted in step 108. In step 110, the encrypted data is automatically transmitted to the consultant's operations center.

Once received by the consultant's operations center, in step 112, the encrypted data is decrypted. The collected artifact data is then processed which involves parsing various binary artifacts into human and/or machine readable output that is stored in a normalized format in step 114 into a database such as a NoSQL database. In step 116, the system automatically analyzes the data with a series of forensic methods, as will be described further below.

The consultant's operations center also executes the reporting component of the system. In step 118, one or more reports of the forensic analysis are automatically generated by the system, in accordance with the types of reports desired by the client. The reports can be customized for certain types of investigations (e.g., departing employee, removable storage analysis, file execution analysis, timeline analysis, and incident response) and for certain types of recipients at the client (e.g., reports generated for a business leader vs. for IT staff). The consultant reviews the reports and undertakes a quality assurance (QA) procedure for each report in step 120. The reports are then transmitted to the client in step 122. The end-to-end automation of the system enables the process, from configuration of the executable to the client's receipt of the reports, to be completed within three hours or even less, according to exemplary embodiments of the invention.

As one non-limiting example, the system may be used in a scenario in which an information technology (IT) administrator or a human resources administrator needs to quickly review a departing employee's activity on a company computer system before an exit interview (i.e., before the employee leaves the company). In this scenario, the data collection and analysis may involve, for example, data collection and analysis of: removable storage device connections; internet history; recently accessed files; installed applications; deleted files; encryption and anti-forensics detection; printing; and/or recent searches.

Another example of a use case of the system is a root-cause analysis of one or more security alerts. For example, with respect to a cyber incident, the automatic data collection and analysis may include one or more of: identifying unknown applications; file execution activity; lateral movement; file system activity; identifying recently executed applications/processes; and production of a timeline of events, moving backwards in time.

A more detailed description of an example of the system and its operation will now be described in connection with FIGS. 2 and 3.

The operation starts with the consultant initially receiving a request from a client for a forensic analysis. The consultant obtains certain information from the client to enable customization of the data collection, such as the type of risk (e.g., detection of malware, data breach, or a departing employee), date and time frame of interest, information on the client and data custodians, the identity of the affected computers, drives, and devices of the client, the types of artifacts, the sources and types of the data, and the desired format of the output of the collection. The consultant or the client enters this information into the front end system, shown in FIG. 3 as element 300 (and in FIG. 2 as element 202).

The front end system, which may be used by the consultant and/or client, may include a graphical user interface (GUI) to facilitate customization of the forensic analysis and to generate the executable. FIG. 3 shows an example of a GUI 300 that can be used. The GUI 300 provides an interface for the consultant and/or the client to configure the executable and to send the executable to the client, thus enabling the client to initiate execution of the executable to perform the targeted data collection on the client's systems, devices, and drives. The following example contemplates that the consultant is the user of the GUI; however, in other examples, the client or another entity or individual may be the party that uses the GUI to generate the executable.

Referring to FIG. 3, element 302 of the GUI 300 includes data fields that enable entry of various options for the output package from the data collection, including the file name, output location, package password, and encryption and directory options for the output. In element 304, the GUI includes data fields that enable entry of collection information such as host name, host media type, client name, matter number, and custodian name. This information is used for chain of custody purposes, thus incorporating a leading practice for evidence collection in forensic analysis.

In element 306, the GUI includes check boxes or other type of selector to allow the consultant to select and deselect artifact options. For example, the artifact options may be selected from a directory tree as depicted. The artifact options selected by the consultant determine the data that will be collected by the executable. As shown in FIG. 3, artifact options may include "All Options," applications, email, internet history, NTFS file system, registry, system and triage, for example. These categories of artifacts (other than "All Options") may each include subcategories of artifacts to enable further customization. For example, as shown in element 306, the triage category may include a number of subcategories including SLogFile, SMFT, Amcache Hive, Application Compatibility Cache, Chrome, Edge History, Event Logs, Internet Explorer History, Java IDX, Jumplist Auto Destinations, Jumplist Custom Destinations, Link files, McAfee Quarantined, NTUSER.DAT, and PowerShell.

According to a preferred embodiment of the invention, the types of artifacts, the list of artifacts, and the categorization of artifacts in the GUI are monitored and updated on a continuing basis (e.g., by the consultant who maintains the system) to ensure that the artifacts targeted by the system are complete and current with respect to all known cybersecurity threats. The list of artifacts in the GUI can be assembled, updated and maintained by the consultant in the form of a "dictionary" of forensic artifacts that comprises a complete list of forensic artifacts for an all-encompassing forensic analysis and for each variety of forensic analysis. As new types of artifacts come into existence (e.g., artifacts generated by new forms of social media or new system or application artifacts), the consultant can add each new artifact to the dictionary. According to one embodiment of the invention, the dictionary contains a list of over 100 pre-defined artifacts which are stored in XML format and categorized by type. For instance, if the consultant wants to collect artifacts associated with an Internet browser application, this collection process may encompass knowing the associated names and locations of hundreds of artifacts. Instead, according to an exemplary embodiment, the system enables the consultant to simply select the name of the desired Internet browser for which to collect artifacts, and the dictionary already includes the names and locations of all the artifact files to be collected. This system enables a consultant to perform a forensic collection that is comprehensive and consistent without relying on the personal knowledge or experience of the consultant conducting the collection.

Referring again to FIG. 3, element 308 allows the consultant or client to specify source information for the data to be searched and collected. For example, the consultant or client can use the GUI to select the modes of collection and the drives and folders from which the data will be collected. The mode may include a live mode for collection during computer system operation, and/or a dead mode (forensic disk images). The GUI allows the consultant or client to select one or more volumes which the consultant or client may define by the drive, partition, size, and date of creation.

The consultant may also select a volume shadow copy (VSC) from which to collect artifacts. A volume shadow copy generally refers to a copy provided by functionality that allows a user to obtain manual or automatic backup copies or snapshots of computer files or volumes, even when they are in use. The ability to search volume shadow copy space allows the system to search back in time, for example during the months or weeks preceding a departing employee's departure. This may be particularly important because although a user may have deleted a file, cleared web history, or an attacker downloaded malware that no longer exists, it may be still be present in the VSC backups.

Thus, the executable may be configured to collect data from different locations on the client's systems, such as user-accessible storage (e.g., network and local drive), volume shadow copy space, and/or archived data corresponding to system data from an earlier date. According to various embodiments, the client may have a single computer or a computer system having multiple on premise computers and servers networked thereon. The executable may be run without having to take the computer system offline.

In element 310, other options may be selected including whether all files are collected or just in-scope files, whether the collected files will be parsed, whether memory will be collected, whether deleted files will be included, whether volatile data will be collected, and whether to de-duplicate collected data.

As will be appreciated from the foregoing description, the system allows a large degree of customization of the collection through the various elements of the GUI 300. This flexibility enables an experienced consultant or client to tailor the forensic data collection to particular circumstances of the cyber event as desired. In addition, the system may be designed to include default settings which enable a less experienced user to take advantage of the capabilities of the system. For example, the system may be programmed to use default settings for selection of the artifacts in different circumstances such as a malware attack, a departing employee, or a data breach, thus making the system easy to use for less experienced users who can simply identify the circumstance rather than select artifacts. Collectively, these features enable a user to conduct comprehensive and consistent forensic collections with or without having significant experience in forensic data collection. Once the user has entered the desired configuration of the data collection (using customized settings, default settings, or a combination of the two), the user (e.g., consultant or client) can initiate the collection by clicking the "Start" button at 312.

Referring again to FIG. 2, once the consultant or client has used the GUI 300 to customize the executable, the executable is transmitted from the consultant to the client site 204, e.g., via a secure file transfer protocol (SFTP). The client site 204 depicted in FIG. 2 represents all of the various systems, devices, shared drives, and cloud-based servers that are owned and/or operated by or on behalf of the client. The executable runs on these systems, devices, drives, and servers to collect forensic artifacts and other data. The executable can be executed locally using the GUI or remotely deployed/executed using a command line interface, for example.

The forensic data that is collected through execution of the executable is assembled, compressed, and then encrypted. According to one embodiment, the data is encrypted using AES 256 encryption. As shown in element 206 of FIG. 2, the encrypted data may be sent securely to the consultant's operations center 208 using one or more different processes, according to various embodiments of the invention. For example, the data may be sent for analysis through an electronic transmission to a file transfer protocol ("FTP") site or server operated by the consultant. According to a preferred embodiment, the data is encrypted for secure transmission and uploaded by the client to a dedicated secure file transfer protocol ("SFTP") site hosted by the consultant at its operations center 208. In other embodiments, the client may elect to send the forensic data to the consultant without encryption. The data may be transferred over a computer network such as the Internet, for example. According to other embodiments, the data may be encrypted (or not), downloaded to a removable storage media (e.g., a USB drive), and then manually transferred to the consultant's operation center 208.

Once received by the consultant, the system can automatically notify the consultant that the forensic data has been received from the client, such as by the system automatically sending the consultant an email message to that effect. The data may then be moved automatically by the system from the SFTP site to a secure staging location and decrypted.

Figure 2:
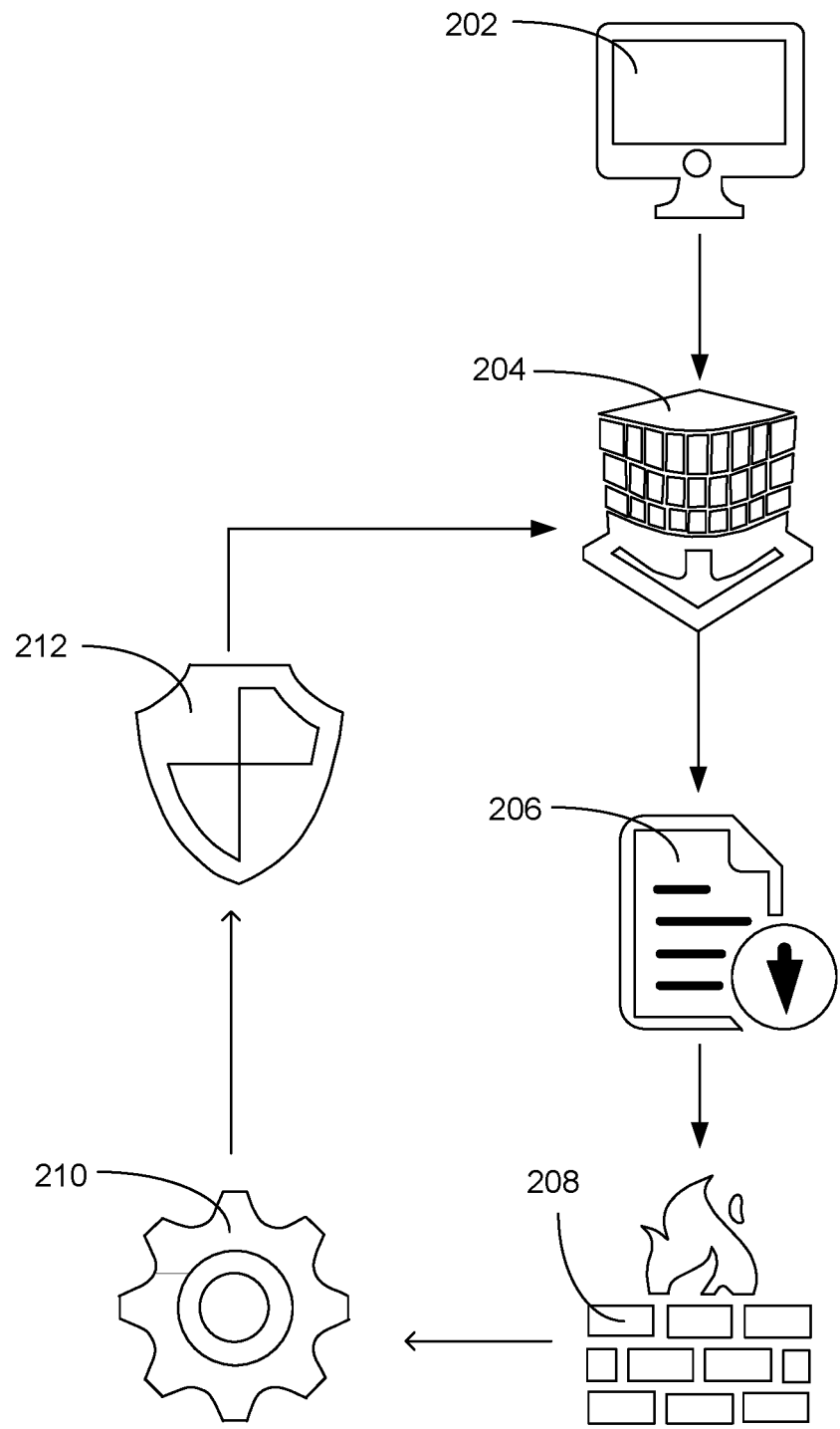
FIG. 2 is a diagram of a system for automated collection, analysis of and reporting of data relating to a cybersecurity event according to an exemplary embodiment of the invention.

According to an exemplary embodiment of the invention, as part of the analysis component depicted as element 210 in FIG. 2, the collected forensic artifact data is automatically parsed and the parsing may yield an output of human readable data. The types of artifacts that get parsed may include, for example: Task Files; Java IDX files; Recycle Bin files; WMI files; Internet Explorer WebCache files; Windows Search History files; Windows SRUM files; FireFox History files; Google Drive Application files; Skype Application files; Prefetch files; Link (shortcut) files; Job files; Restore Point logs; Chrome History folder; Chrome Cache folder; NTFS Index Attribute files ($I30); SYSTEM, SECURITY, NTUSER, USRCLASS, SOFTWARE, and SAM Registry hives; AmCache; Event Logs; Jumplist Auto and Custom Destinations; NTFS Update Sequence Number Journal (UsnJrnl); NTFS Master File Table ($MFT); and Setup API logs.

The parsing is done by utilizing a combination of forensic tools (e.g., software designed for forensic analysis). According to one embodiment of the invention, the forensic tools include software that has been developed internally by the consultant, open source software (OSS) tools, and/or software that is commercially licensed to the consultant from one or more third parties. The collection of forensic tools may be referred to herein as the "forensic toolset." According to a preferred embodiment of the invention, the forensic toolset provides a comprehensive and complete analysis engine that analyzes all the artifacts collected by the collection component. Similar to the manner in which the dictionary of artifacts described above, the forensic toolset may be continually maintained and updated. The system can therefore provide forensic analysis that is comprehensive and reliable because the forensic toolset is maintained to be complete and current.

The output from the forensic toolset is then inserted and stored in a NoSQL (Elasticsearch) database or other type of database according to an exemplary embodiment of the invention. This allows the data to be normalized and indexed for searching and correlation. During this process, component 210 may include an interface that allows the consultant to view the processing status, download artifacts, and create reports. This interface to the analysis component 210 allows the consultant to view and study the collected forensic data as the analysis component 210 is running.

Upon completion of storing the forensic data in the analysis component 210, the reporting component 212 of the system can automatically generate one or more forensic analysis reports. The reports describe the forensic analysis performed by the system. The reports can be tailored to different types of readers at the client. For example, in various embodiments, the reports may be tailored for either technical audiences (e.g., IT staff) or non-technical audiences (e.g., business leaders). The one or more reports may be automatically generated by the reporting component 212.

According to one example, the types of reports that may be automatically generated by the reporting component 212 include: a "Kitchen Sink Report," a "Removable Storage Device Report," a "Departing Employee Investigations Report," a "Security Operation Center Report," and/or a "Timeline Report."

The "Kitchen Sink Report" may be designed for an experienced technical analyst who wants to see all aspects of the forensic collection and analysis. The "Removable Storage Device Report" may be designed for technical analysts investigating activities involving external devices, such as flash drives or external hard drives. The "Departing Employee Investigations Report" may be designed for a non-technical reader to understand potentially important events leading up to an employee's departure. The "Security Operations Center Report" may be designed for an experienced technical analyst investigating root cause analysis related to a technical alert or indicator of compromise, such as a data breach. The "Timeline Report" may be designed to allow a technical analyst to view a detailed timeline of events that occurred during a particular period of time.

The consultant will typically obtain input from the client as to the types of reports that are desired before generating the reports. For example, the client may want a Departing Employee Investigations Report only, or the client may want a number of different reports. The consultant or client can then use an interface to the reporting component 212 to specify the desired reports to be generated. After the reports are generated, the consultant will typically undertake a quality assurance (QA) process prior to sending each report to the client. Because the reports are generated using the dictionary of artifacts and forensic toolset, they provide a comprehensive, consistent, and complete analysis of forensic activities that have taken place on the client's systems and devices. The client, therefore, obtains a comprehensive report within a matter of hours that has the significant advantages of being consistent, comprehensive and current as to the identification and analysis of cybersecurity threats.

According to one particular example, a departing employee report may be automatically generated that includes information as follows. The report may include a "Report Information" summary, an example of which is shown in FIG. 8. The Report Information summary may list specific identifying data for the forensic collection and analysis, such as a matter number, evidence number, custodian name, employee profile user name, employee departure notification date, employee last day of employment, host name, operating system, volume shadow copies in collection, and other report information as shown in FIG. 8. The "Report Information" summary may also indicate the scope of the report, e.g., the last 30 days of the employee's employment.

The automatically generated report may also include a Summary of Findings, an example of which is shown in FIGS. 9A and 9B. The Summary of Findings may include a number of overall categories of activity types, such as removable storage device activity, file activity, Internet activity, program activity, email activity, and other activity, along with subcategories of each activity type as shown in FIGS. 9A and 9B. The Summary of Findings may include a summary of the total number of instances of each type of activity that occurred and whether a date filter has been applied to the results. The Summary of Findings may include a color coded and/or other type of indicator illustrating the potential risk level (e.g., low, medium, high, or unknown risk) for each type of activity, e.g., based on the total number of instances, as shown in FIGS. 9A and 9B. The Summary of Findings can therefore efficiently and effectively illustrate to the client various risk levels associated with various activities of the employee.

The assumptions underlying each risk level may be explained in a separate section of the report. FIGS. 10A and 10B illustrate one example of the risk level assumptions according to an exemplary embodiment of the invention. As shown in FIGS. 10A and 10B, each activity has a defined number or range of instances that correspond to low, medium and high risk. These risk criteria assumptions allow the recipient of the report to understand the basis for characterizing a certain level of activity as low, medium or high risk, for example. The information contained in FIGS. 10A and 10B may be color coded corresponding to each risk level (e.g., green, yellow, red) illustrating the potential risk level (e.g., low, medium, high).

The body of the report may include detailed descriptions of a number of types of activities, including (1) removable storage activity, (2) file activity, (3) Internet activity, (4) program activity, (5) email activity, and (6) other activity. According to one embodiment of the invention, the description of removable storage activity may include a description of all unique removable storage devices, removable storage device connections, mobile phone backup files, and DVD/CD-ROM read/write activity. The description of file activity may include an overview of file activity and a description of all accessed items, items interacted with on potential external sources, items interacted with on network shared drives, archive/encrypted containers created, user files created, user files modified, user files deleted, recycle bin items, Microsoft Office alerts, printed files, Windows searched terms, and typed paths. The description of Internet activity may include an overview of network activity, and descriptions of web browsers installed, downloaded files, typed URLs, search engine queries, cloud storage websites visited, personal email websites visited, and Internet history. The description of program activity may include a description of file sharing software present, encryption software present, remote access software present, instant messaging communication software present, application development software present, cloud storage software present, file compression software present, anti-forensics software present, virtualization software installed, virtual machine related files created/modified/accessed, and programs uninstalled. The description of email activity may include a description of email containers, email attachments, and external email addresses. The description of other activity may include a description of associated networks, user accounts on the system, and volume shadow copies in the collection. The body of the report can include explanation and additional details as to each type of activity that was discovered and analyzed in the collection and analysis phase.

The report generator creates reports by running a series of analysis queries against the database. For example, to identify potential remote desktop connections from external IP addresses, the following query may be run: "(Channel: Microsoft-Windows-Terminal Services-RemoteConnection-Manager AND EventID:1149)". Similarly, to identify if a new service has been installed (this may indicate that an attacker created a service to run a payload remotely) the following query may be run: "((Channel:Security AND EventID:4697) OR (Channel:System AND EventID:7045) OR (Channel:System AND EventID:601))". Lastly, another example, to identify executables run as scheduled tasks (this may indicate that an attacker created a scheduled task to run a payload remotely) the following query may be run: "(Channel:\\\"Microsoft-Windows-TaskScheduler/Operational\\\" AND EventID:200 AND ActionName:*.exe)". The output of these queries are formatted and displayed in a report.

Additional detailed examples of the automated analysis (via querying the database) of collected forensic data by the analysis component 210 will now be described with reference to FIGS. 4-7.

Figure 4A:
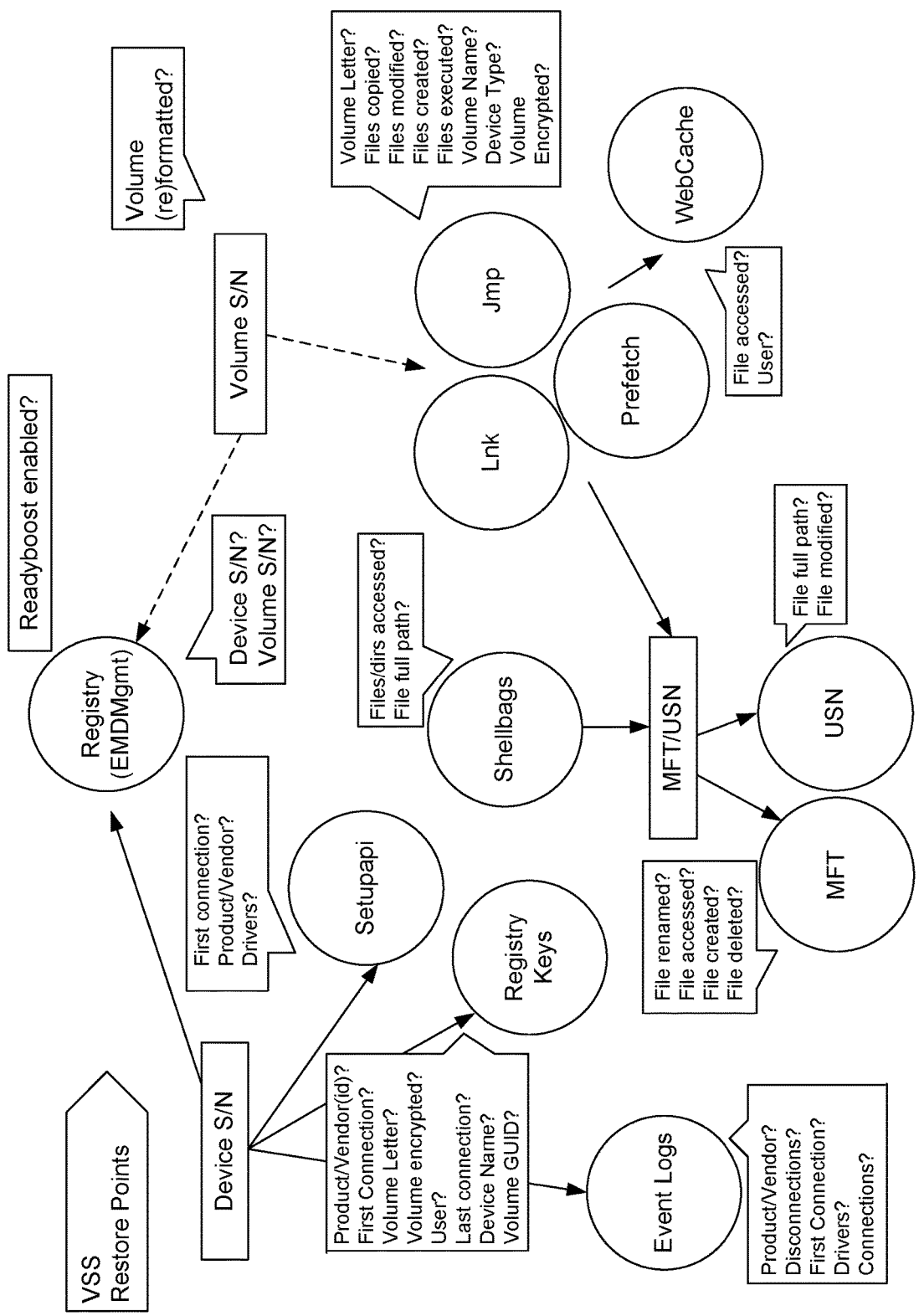
FIG. 4A is a diagram illustrating a removable storage device analysis according to an exemplary embodiment of the invention.

Referring to FIG. 4A, a flowchart of the analysis of forensic artifacts related to removable storage device connections is shown according to an exemplary embodiment of the invention. The analysis may include artifacts such as the MFT (master file table), USN (update sequence number), Prefetch, Jumplist, Link files, Setupapi, Registry files, Internet History, and Event Logs. This data may originate from one or many sources including the logical computer volume, one or more volume shadow service ("VSS"), or restore points.

The analysis of these forensic artifacts may utilize a device serial number, volume serial number, and/or master file table/update sequence number (MFT/USN) or other indicators to correlate activities associated with removable storage device activity. This will allow the system to automatically determine data points such as when the first connection was made; volume letter associated with connections; whether the volume was encrypted; who the user was that made the connection; when the last connection was made; device and vendor name; what files were accessed/created/modified, and/or volume GUID.

FIG. 4B provides an example of one report for removable storage device activity. As shown in FIG. 4B, the resulting normalization of removable device activity may include a device number 454, information about the device 456, any notes about the device 458, one or more date/time stamps 460 corresponding to a particular event 462 (e.g., when the device was first connected; when the device was installed; when the device was connected and/or disconnected; when a target file was executed; entry of WebCache; etc.) along with a particular source 464 (e.g. Jumplist; Prefetch entry; WebCache entry; System Windows Event Log; etc.) and a corresponding confidence indicator 466 (e.g., low, medium, high) related to level of certainty conclusions can be made regarding activity observed associated to a device serial number.

Figure 5A:
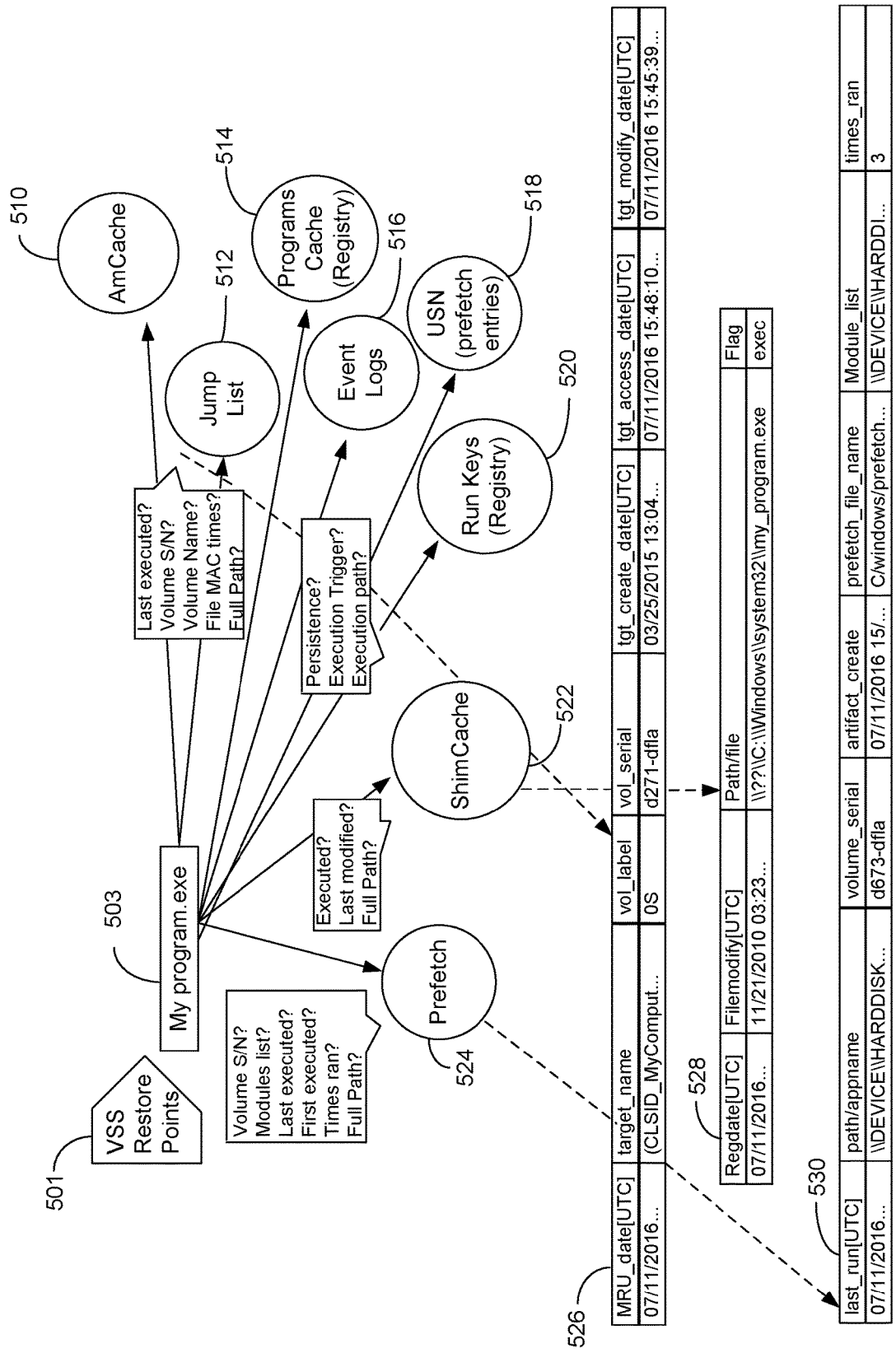
FIG. 5A is a diagram showing an example of program execution analysis in accordance with an exemplary embodiment of the invention.

FIG. 5A is a diagram showing an example correlation of program execution analysis according to an exemplary embodiment of the invention. The process may comprise analysis of execution of one or more programs from the logical volume, one or more volume shadow service ("VSS"), or restore points 501. Parameters for this type of analysis may include data collected and analyzed from one or more artifacts. For example, the program "my program.exe" 503 may generate one or more artifacts that can be collected and analyzed, such as AmCache 510, Jumplist 512, Programs Cache (Registry) 514, Event Logs 516, USN (prefetch entries) 518, Run Keys (Registry) 520, ShimCache 522, and Prefetch 524. The data to be collected and analyzed from AmCache 510 and Jumplist 512 may include: when the program was last executed; volume serial number; volume name; file MAC times; and full path. The data to be collected and analyzed from Event Logs, USN (Prefetch entries), and Run Keys (Registry) may include: persistence; execution trigger; and execution path. The data to be collected and analyzed from ShimCache may include: when the program was executed; when the program was last modified; and the full path. The data to be collected and analyzed from Prefetch may include: the volume serial number; modules list; when the program was first executed; when the program was last executed; how many times the program was run; and the full path.

During the analysis, outputs may be produced from the data, as shown in the three tables at the bottom of FIG. 5A. The output in the first table 526 may include: MRU_date, target_name, vol_label (e.g., operating system), volume serial, tgt_create_date, tgt_access_date, and tgt_modify_date. The output in the second table 528 may include regdate, filemodify, Path/file name, and Flag. The output in the third table 530 may include last_run, path/appname, volume_serial, artifact_create, prefetch_file_name, Module_list, and times_ran.

FIG. 5B shows an example of the output from a normalization of program execution activity. As shown in FIG. 5B, the normalization of program execution activity may include a time stamp, artifact name, and a path/application name as shown in table 550. Additional columns can be included in the data as shown in table 552. This allows the reader to see a timeline of when program execution activity occurred, and details about each program.

FIG. 6 depicts an example of a table 600 of file extension activity according to an exemplary embodiment of the invention. The table 600 of file extension activity may identify a number of events taking place on particular dates. The dates may be listed in the first column 602 of the table. The events may be listed in additional columns of the table. The table 600 can therefore illustrate a number of events for each day in a sequential period, for example. In the example in FIG. 6, each row includes a particular date along with a number of events taking place on that date, such as the number of files created 604 on that date 602; how many files were accessed 606; how many files were modified 608; how many files were deleted 610, the top 10 created file extensions 612 (e.g., tmp, ini, xml, exe, xbf, xml, log1, log2, json, js, da, exe, pri), the top 10 accessed file extensions 614 (e.g., tmp, xml, exe, ini, nlp, log1, log2, dat), the top 10 modified file extensions 616 (e.g., dat, tmp, ini, xml, ext, log, log2, sth, bin, crx, js), and the top 10 deleted file extensions 618 (e.g., ini, dat, txt, png). The table 600 of file extension activity can therefore provide valuable information to the consultant and client as to the level of activity over time on various types of files.

According to another aspect of the invention, the system may include an associated database of information that provides data enrichment to the forensic analysis. As used herein, "data enrichment" generally refers to the use of a complete and current knowledge base of computer hardware, software, and services, worldwide, for the purpose of providing a comprehensive and complete forensic analysis. This database preferably contains information on particular types of resources, worldwide, such as a worldwide list of all cloud storage services as one example.

Other examples of such "data enrichment" information that can be stored in and used in the reporting component 212 include: archiving encrypted file extensions; browsers installed; cloud storage tools; cloud storage websites; common user files extensions; compression tools; database file extensions; email files; email web sites; encryption tools; file sharing tools; instant messaging tools; lateral movement processes; local reconnaissance processes; stenography tools; virtual machine extensions; virtualization tools; wipe/antiforensic tools; media-related tools; media file extensions; mobile phone files; network reconnaissance processes; program development tools; remote access tools; and potentially suspicious files (Chrome, Csrss, Xplorer, Lsass, Svchost, Win, Winlogon, Java, Iexplore, Firefox).

According to one particular example, the data enrichment process involves analysis of the collected data with reference to remote access related programs from resources files. The reporting component 212 compiles data illustrating use of remote access programs, including the executable name and file path. The reporting component 212 allows the consultant to create a report, showing the use of the remote access programs, including an artifact and timestamp, a file path, a filename and a date and time of last execution. This data enrichment information allows the consultant to see all use of remote access programs to access company data, for example.

FIG. 7 illustrates a table 700 showing an example of logon analytics (for security events) according to an exemplary embodiment of the invention. As shown in FIG. 7, the table may include columns for a date 702, as well as a target username 704, logon counts 706, and logon types 708. The logon counts 706 may include the total logons in a day. The logon types 708 may include a number for different logon types.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements. For example, while various embodiments are described in the context of forensic data collection in response to potential cybersecurity threats, the various embodiments could also be used, for example, to collect data for analysis of tracking of use of particular application to determine if the application is needed or should continue to be installed.

The foregoing descriptions provide examples of different configurations and features of embodiments of the invention. While certain nomenclature and types of applications/hardware are described, other names and application/hardware usage is possible and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the executable may be implemented as one or more computer program products, for example, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

While the embodiments have been particularly shown and described within the framework for identifying cybersecurity threats, it will be appreciated that variations and modifications may be effected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A computer-implemented method for automatic collection, analysis and reporting of a cybersecurity threat, the method comprising:
provoding a graphical user interface designed to receive (i) a selection of one or more types of forensic artifacts to collect relating to a departing employee and (ii) one or more data source designations, wherein the one or more data source designations correspond to data sources including forensic artifacts that can be searched and collected;
creating a standalone executable computer program to collect forensic artifacts on a remote client system based on the selection of one or more types of forensic artifacts to collect and one or more data source designations (the "executable computer program");
transmitting the executable computer program to a client computer to enable the client computer to execute the executable computer program on the client's remote client system computer to automatically collect the forensic artifacts based on the selection of the one or more types of forensic artifacts and the one or more data source designations with the interface, wherein collecting the forensic artifacts comprises obtaining the forensic artifacts from archived data corresponding to system data from a date earlier than a date of an execution of the executable computer program;

receiving from the client computer an encrypted data package, wherein the encrypted data package includes the forensic artifacts automatically collected by the executable computer program;

decrypting the encrypted data package to produce decrypted forensic artifacts;

using a forensic toolset to automatically analyze the decrypted forensic artifacts, wherein the forensic toolset comprises a set of forensic tools that output analysis results, wherein analyzing the decrypted forensic artifacts is based on one or more analytic routines and one or more custom queries comprising a departing employee analysis;

presenting through the graphical user interface an option to select one or more of at least two types of output reports, wherein the two types of output reports comprise an output report customized for a plurality of different types of forensic investigations and an output report customized for the technical proficiency of a given plurality of different readers at the client;

receiving from the client computer a selection of one or more of the at least two types of output reports;

inputting the analysis results into an automatic report generator to automatically generate the types of output reports selected by the client computer; and sending the selected output reports to the client computer.

2. A method for identifying one or more cybersecurity threats, the method comprising:

creating a standalone executable computer program to collect forensic artifacts on a remote client system based on a selection of one or more types of forensic artifacts to collect and one or more data source designations (the "executable computer program"), wherein the executable computer program is customized through a graphical user interface, wherein the graphical user interface is designed to receive (i) the selection of one or more types of forensic artifacts to collect, and (ii) one or more data source designations, wherein the one or more data source designations correspond to data sources including forensic artifacts that can be searched and collected, wherein obtaining the forensic artifacts comprises obtaining the forensic artifacts from archived data corresponding to system data from a date earlier than a date of an execution of the executable computer program;

remotely collecting the targeted data from at least one remote client computer by executing the executable computer program on the at least one remote client computer;

encrypting the remotely collected targeted data;

receiving the encrypted targeted data from the at least one remote client computer;

decrypting the encrypted targeted data;

processing the decrypted data, wherein processing the decrypted data is based on one or more analytic routines and one or more custom queries comprising a departing employee analysis; and generating one or more reports based on the processing wherein results from the processing are normalized for consistency, and wherein the one or more reports comprise an output report customized for a plurality of different types of forensic investigations and an output report customized for the technical proficiency of a given plurality of different readers at the client.

3. The method of claim 2, wherein the executable computer program is customized to perform collection of a specific set of targeted data.

4. The method of claim 2, wherein the graphical user interface comprises one or more categories comprising one or more forensic artifacts for collection, the one or more categories corresponding to cyber security events.

5. The method of claim 2, wherein obtaining targeted data comprises obtaining one or more types of forensic artifacts from a system.

6. The method of claim 2, wherein obtaining the targeted data comprises obtaining the forensic artifacts from at least one of user accessible storage and volume shadow copy space.

7. The method of claim 2, wherein processing the decrypted data is based on the one or more analytic routines and the one or more custom queries comprising one or more of the following: data enrichment; whitelisting/blacklisting; program execution analysis;

and artifact classification and correlation.

8. A computer-implemented system for automatic collection, analysis and reporting of a cybersecurity event, the system comprising:

a memory; and a computer processor that is programmed to:

provide a graphical user interface designed to receive (i) a selection of one or more types of forensic artifacts to collect relating to a departing employee, and (ii) one or more data source designations, wherein the one or more data source designations correspond to data sources including forensic artifacts that can be searched and collected;

create a standalone executable computer program to collect forensic artifacts on a remote client system based on the selection of one or more types of forensic artifacts to collect and one or more data source designations (the "executable computer program"), and wherein the forensic artifacts are from archived data corresponding to system data from a date earlier than a date of an execution of the executable computer program;

transmit the executable computer program to a client computer to enable execution of the executable computer program on the client's remote client system computer to automatically collect the forensic artifacts based on the selection of the one or more types of forensic artifacts and the one or more data source designations with the interface;

receive from the client computer an encrypted data package, wherein the encrypted data package includes the forensic artifacts automatically collected by the executable computer program;

decrypt the encrypted data package to produce decrypted forensic artifacts;

use a forensic toolset to automatically analyze the decrypted forensic artifacts, wherein the forensic toolset comprises a set of forensic tools that output analysis results, wherein analyzing the decrypted forensic artifacts is based on one or more analytic routines and one or more custom queries comprising a departing employee analysis;

present through the graphical user interface an option to select one or more of at least two types of output reports, wherein the two types of output reports comprise an output report customized for a plurality of different types of forensic investigations and an output report customized for the technical proficiency of a given plurality of different readers at the client computer;
receive from the client computer a selection of one or more of the at least two types of output reports;
input the analysis results into an automatic report generator to automatically generate the types of output reports selected by the client computer; and
electronically transmit the selected output reports to the client computer.

9. The system of claim 8, wherein the graphical user interface is designed to allow the executable computer program to be customized to perform collection of a specific set of targeted data.

10. The system of claim 9, wherein the graphical user interface identifies one or more categories of forensic artifacts for collection.

11. The system of claim 9, wherein the graphical user interface is designed to specify the target data comprising the forensic artifacts from at least one of: user accessible storage and volume shadow copy space.

* * * * *